United States Patent
Lazarev et al.

(10) Patent No.: US 7,557,876 B2
(45) Date of Patent: Jul. 7, 2009

(54) ANISOTROPIC FLUORESCENT THIN CRYSTAL FILM AND BACKLIGHT SYSTEM AND LIQUID CRYSTAL DISPLAY INCORPORATING THE SAME

(75) Inventors: Pavel I. Lazarev, Belmont, CA (US); Michael V. Paukshto, Foster City, CA (US)

(73) Assignee: Nitto Denko Corporation, Ibaraki-Shi (JP)

( * ) Notice: Subject to any disclaimer, the term of this patent is extended or adjusted under 35 U.S.C. 154(b) by 735 days.

(21) Appl. No.: 10/890,331

(22) Filed: Jul. 12, 2004

(65) Prior Publication Data

US 2005/0052859 A1   Mar. 10, 2005

Related U.S. Application Data

(60) Provisional application No. 60/490,202, filed on Jul. 25, 2003.

(51) Int. Cl.
*G02F 1/1335* (2006.01)

(52) U.S. Cl. .............................. 349/105; 349/63; 349/65

(58) Field of Classification Search .................... 349/63, 349/65, 105
See application file for complete search history.

(56) References Cited

U.S. PATENT DOCUMENTS

| | | | |
|---|---|---|---|
| 4,211,473 A | 7/1980 | Shanks | |
| 4,364,640 A | 12/1982 | Krüger et al. | |
| 5,739,296 A | 4/1998 | Gvon et al. | |
| 5,828,488 A | 10/1998 | Ouderkirk et al. | |
| 5,982,540 A | 11/1999 | Koike et al. | |
| 6,049,428 A | 4/2000 | Khan et al. | |
| 6,088,067 A | 7/2000 | Willett et al. | |
| 6,118,503 A | 9/2000 | Oki et al. | |

(Continued)

FOREIGN PATENT DOCUMENTS

CN     1191610 A     8/1998

(Continued)

OTHER PUBLICATIONS

Bobrov, Y.A., "Dependence of the anisotropic absorption coefficent on the thickness of molecularly oriented organic dye films", *J. Opt. Technol.* 66(6), Jun. 1999, pp. 547-549.

(Continued)

*Primary Examiner*—David Nelms
*Assistant Examiner*—David Y Chung
(74) *Attorney, Agent, or Firm*—Westerman, Hattori, Daniels & Adrian, LLP.

(57) ABSTRACT

The backlight system including, an anisotropic fluorescent thin crystal film with the optical parameters matched to the spectral characteristics of a light source, and a liquid crystal display incorporating the backlight system are disclosed. The backlight system comprises at least one light source having an emission spectrum with at least one peak in the wavelength range between 250 and 450 nanometers, and an anisotropic fluorescent thin crystal film (AF TCF) placed on at least one element of the backlight system so that it is on a light path of the light emitted by the light source. The anisotropic fluorescent thin crystal film is formed by rodlike supramolecules composed of disc-shaped molecules of at least one polycyclic organic compound with conjugated π-system, emitting polarized visible light when irradiated by light from said wavelength range.

31 Claims, 6 Drawing Sheets

U.S. PATENT DOCUMENTS

| | | | |
|---|---|---|---|
| 6,128,059 A * | 10/2000 | Nishiguchi | 349/129 |
| 6,163,351 A | 12/2000 | Nakayama | |
| 6,172,809 B1 | 1/2001 | Koike et al. | |
| 6,344,886 B2 | 2/2002 | Oki et al. | |
| 6,464,367 B2 | 10/2002 | Ito et al. | |
| 6,594,062 B1 * | 7/2003 | Weder et al. | 359/245 |
| 6,654,079 B2 * | 11/2003 | Bechtel et al. | 349/70 |
| 6,899,440 B2 * | 5/2005 | Bierhuizen | 362/19 |
| 2001/0033417 A1 | 10/2001 | Lee et al. | |
| 2001/0046006 A1 | 11/2001 | Oki et al. | |
| 2002/0041501 A1 | 4/2002 | Oki et al. | |
| 2002/0093611 A1 * | 7/2002 | Lazarev et al. | 349/117 |
| 2002/0097370 A1 | 7/2002 | Nose et al. | |
| 2003/0232153 A1 * | 12/2003 | Nazarov et al. | 428/1.3 |
| 2004/0036817 A1 * | 2/2004 | Paukshto et al. | 349/56 |

FOREIGN PATENT DOCUMENTS

| | | |
|---|---|---|
| CN | 1248714 A | 3/2000 |
| EP | 0 864 905 A2 | 9/1998 |
| EP | 1 004 921 A1 | 5/2000 |
| EP | 1 004 921 A2 | 5/2000 |
| GB | 2 331 615 A | 5/1999 |
| JP | 58171486 | 9/1983 |
| JP | 58171486 | 4/1985 |
| JP | 60061725 A2 | 4/1985 |
| WO | 9701780 | 1/1997 |
| WO | WO 97/01780 A1 | 1/1997 |
| WO | WO 97/39380 A1 | 10/1997 |
| WO | WO 99/01792 A1 | 1/1999 |
| WO | WO 01/81991 A1 | 11/2001 |
| WO | WO 02063660 A1 * | 8/2002 |
| WO | WO 03/023277 A1 | 3/2003 |

OTHER PUBLICATIONS

Lazarev, P., et al., "Thin Crystal Film Retarders", *Proceeding of the 7th International Workshop "Displays, Materials and Components"*, Kobe, Japan, Nov. 29-Dec. 1, 2000, pp. 1159-1160.

Lazarve, P., et al., "Self-Assembly Optical Components", *Mat. Res. Soc. Symp. Proc.*, Voil. 771, 1993, pp. L10.10.1-L10.10.6.

Lehn, Jean-Marie "Supramolecular Chemistry: Concepts and Perspectives", Wiley, John & Sons, Inc.; New York, 1999 (book).

Lazarev, P., et al., "*Thin Crystal Film Retarders*", Proceedings of the 7th International Workshop "Displays, Materials and Components", Kobe, Japan, Nov. 29-Dec. 1, 2000, pp. 1159-1160.

Lehn, Jean-Marie, "*Supramolecular Chemistry: Concepts and Perspectives*", Book, Wiley, John & Sons, Incorporated, Sep. 1999, Abstract.

Chinese Office Action dated Jun. 6 (mailing date), issued in corresponding Chinese Patent Application No. 2004800204535.

\* cited by examiner

ANISOTROPIC FLUORESCENT THIN CRYSTAL FILM AND BACKLIGHT SYSTEM AND LIQUID CRYSTAL DISPLAY INCORPORATING THE SAME

RELATED APPLICATIONS

This application claims priority to U.S. Provisional Application Ser. No. 60/490,202, filed on Jul. 25, 2003, the disclosure of which is incorporated by reference in its entirety.

FIELD OF THE INVENTION

The present invention relates to the field of data display devices and to back light system for data display device. More specifically, this invention relates to backlight systems for liquid crystal displays comprising a light source and an anisotropic fluorescent thin crystal films possessing improved optical characteristics.

BACKGROUND OF THE INVENTION

Liquid crystal displays (LCDs) with backlight systems occupy an important position among data display devices of various types, both in the volume of production and in respect of their performance characteristics. Such LCDs are widely used in laptop PCs, calculators, mobile telephones, watches, home TV, and many other appliances and devices. The wide range of applications stimulates developers to implement new promising system and technologies. This research and development is aimed, in particular, at increasing the power and efficiency of the backlight systems, reducing their dimensions, and optimizing the spectral and polarization characteristics of radiation backlighting the LCDs.

There are two principal approaches to solving these problems. The first is to increase the intensity of visible light illuminating LCDs, while the second consists in using backlight systems generating partially polarized radiation. The former approach implies either an increase in the power of radiation sources (and, hence, in the weight dimensions and power consumption of the device) or conversion of the ultraviolet (UV) radiation component of the source into visible light. The latter solution implies the use of polarizing prisms, mirrors reflecting light at the Brewster angle, or polarizers of various types.

There are known designs of LCDs in which an increase in the image contrast and brightness is achieved through the use of fluorescent materials and elements based on such materials. For example, U.S. Pat. No. 4,211,473 provides an LCD with enhanced contrast, with pleochroic and fluorescent materials incorporated in one or more components of the device. The materials are used in balanced proportion and possess complementary optical absorption and emission spectra. The radiant flux incident onto the display is converted so that the light reaching the eye from the bright state regions of the display is neutral gray in contrast to the light from the dark state regions, which is strongly attenuated or strongly colored.

Another design disclosed in EP 1,004,921 comprises a liquid crystal layer placed between the front and back substrate plates, with one electrode and one polarizer on each of the plates, and a layer containing a dye. The dye layer is either single-component, emitting in the range of 400-700 nm under the action of UV radiation, or represents a mixture of luminescent and absorbing dyes. The purpose of the invention is to achieve greater brightness, increase color saturation of the image, and expand the viewing angle of LCDs up to 180, by more effectively utilizing the emission spectrum of the radiation source, in particular, in the UV range.

Fluorescent materials are used in LCDs for the correction of color and obtaining bright and saturated color images. In particular, U.S. Pat. No. 4,364,640 describes a device for capturing, guiding and concentrating light extracted via an outlet window comprising at least one flexible foil made of a synthetic material containing a fluorescent component capable of converting ambient light into fluorescent light. The device can include second and the third flexible foils transmitting the light outgoing from the outlet window. In one embodiment, a pair of foils is arranged behind a liquid crystal display. Each foil contains a fluorescent material and their polarization planes are perpendicular to each other. An optically active layer placed between the two foils rotates the direction of polarization. The light is extracted through a foil on the side opposite to the liquid crystal cell, so that a viewer sees the light modulated by the cell.

Japanese Patent 60:061,725 describes a color LCD with increased brightness. The device employs a fluorescent material, in which emission is excited by visible light of a short wavelength, instead of using a color filter.

Devices of another type employ polarized light for illuminating LCDs. In such devices, the light polarizers are arranged on the surface of elements of the backlight system or between the backlight system and a liquid crystal cell. For example, a surface light source device with polarization function comprises a fluorescent lamp enclosed by a silver foil sheet from which a parallel illuminating light flux is extracted through a light exit surface and a polarization converter. The polarization converter enhances the polarization function of the surface light source device through polarization conversion action accompanying reflection in a prism. An intensely bright polarized illuminating light flux is extracted through a light exit surface. When such a backlight system is applied in an LCD, an exit light direction modifier is arranged outside the LCD panel.

Another means of illuminating LCDs with a polarized light is offered by a backlight unit comprising a lamp and a set of prisms arranged in between the light guide plate and reflecting film, projecting and condensing light from one side of the light guide reflector. The prisms have a prism angle such that the angle between the direction of light incidence onto the surface of the prism and the normal to the surface is equal to the Brewster angle. The prisms are arranged so that they are parallel to the direction of the polarization axis of the polarizing plate on the bottom surface of the liquid crystal panel.

The most effective system capable of converting all the nonpolarized incident light flux into polarized light with minimum losses is offered by the so-called optical recycling scheme with reflective polarizer.

The reflective polarizer usually comprises a multilayer structure consisting of alternating anisotropic and isotropic layers, with the refractive index of an isotropic layer being equal to that of one of the anisotropic layers. This structure is capable of transmitting light in one polarization state while reflecting light of the perpendicular polarization. In one of such structures, the reflected polarized light passes through a quarter-wave plate, changes the polarization direction, reflects from a mirror, then again passes through a quarter-wave plate, and enters the reflective polarizer again, this time in the first polarization state.

Another variant of the optical recycling scheme stipulates depolarization of the light component reflected from the reflective polarizer. This can be achieved, for example, by using a diffuse reflector. Upon reflection, the nonpolarized light enters the reflective polarizer.

The aforementioned methods and LCD design solutions are aimed at improving separate characteristics of backlight systems, rather than at solving the general problem of obtaining a bright high-efficiency source of polarized radiation possessing required spectral properties and desired dimensions (including those intended for use in thin-film devices).

SUMMARY OF THE INVENTION

It is an object of the present invention to provide the backlight system and an anisotropic fluorescent thin crystal film with the optical parameters matched to the spectral characteristics of a light source.

One embodiment of the present invention discloses the backlight system comprising at least one light source having an emission spectrum with at least one peak in the wavelength range between 250 and 450 nanometers. An anisotropic fluorescent thin crystal film (AF TCF) is placed on at least one element of the backlight system so that it is on a light path of the light emitted by the light source. The anisotropic fluorescent thin crystal film is formed by rodlike supramolecules composed of disc-shaped molecules of at least one polycyclic organic compound with conjugated π-system, emitting polarized visible light when irradiated by light from said wavelength range.

Yet another embodiment provides a liquid crystal display with the backlight system disclosed.

BRIEF DESCRIPTION OF THE DRAWINGS

Other objects and advantages of the present invention will become apparent upon reading the detailed description of the invention and the claims, and upon reference to the drawings, in which:

DETAILED DESCRIPTION OF THE INVENTION

Figure 1:
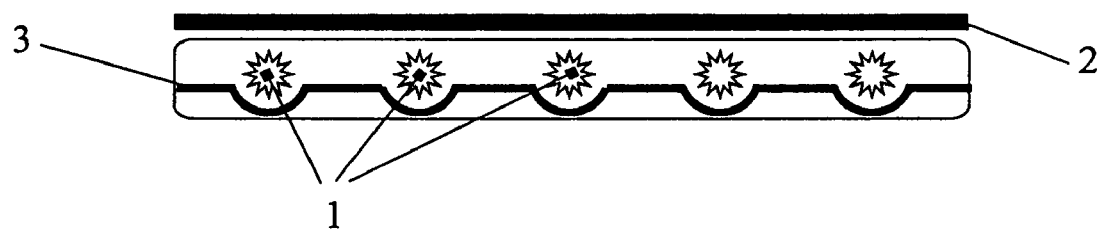
FIG. 1 is a schematic cross section of a backlight system according to the invention with the AF TCF placed directly onto the light source.

A special feature of the molecules of a number of organic dyes is the ability to form supramolecular liquid crystal mesophases. Containing peripheral functional groups, the mesophases of organic dyes are characterized by specific structures, phase diagrams, optical properties, and dissolving capabilities [J.-M. Lehn, *Supramolecular Chemistry* (New York, 1998)].

By using dichroic dyes capable of forming lyotropic liquid crystal (LLC) systems, it is possible to obtain TCFs possessing a high degree of optical anisotropy. Such films exhibit the properties of E-type polarizers, which are related to peculiarities of the optical absorption of supramolecular complexes, and behave as retarders (phase-shifting films) in the spectral ranges where the absorption is insignificant. The retarding properties of these anisotropic films are related to their birefringence (double refraction) that is, to a difference in refractive indices measured in the direction of application of the LLC solution onto a substrate and in the perpendicular direction. Films formed from the LLC systems based on strong (light-fast) dye molecules are characterized by high thermal stability and light resistance. Said TCFs can be obtained by methods known as the Optiva technology [see PCT Publication WO 03/007025, U.S. Patent application publications 2003-0154909 and US 2004-067324, and P. Lazarev and M. Paukshto, Proceeding of the 7th International Workshop "Displays, Materials and Components" (Kobe, Japan, Nov. 29-Dec. 1, 2000), pp. 1159-1160].

The same methods were used to obtain AF TCFs according to the disclosed invention, which were selected depending on the optical parameters required for a particular liquid crystal cell and taking into account the light source employed in a particular backlight system. Selection of the base material for such a film is determined by the required optical properties (the presence of an appropriate photoluminescence excitation band, corresponding to the emission spectrum of a light source used in the backlight system and the emission band necessary for the LCD operation). Another necessary condition is the presence of a developed system of π-conjugated bonds in conjugated aromatic rings of the molecules and the presence of groups (such as amine, phenol, ketone, etc.) lying in the plane of the molecule and entering into the aromatic system of bonds. The molecules and/or their molecular fragments possess a planar structure and are capable of forming a stable lyotropic liquid crystal phase.

When dissolved in an appropriate solvent, such an organic compound forms a colloidal system (lyotropic liquid crystal solution) in which molecules are aggregated into supramolecules constituting kinetic units of the system. This liquid crystal phase is essentially a precursor of the ordered state of the system, from which a solid optically anisotropic (dichroic) crystal film (sometimes also called thin-film crystal) is formed in the course of subsequent alignment of the supramolecules and removal of the solvent.

A method stipulated for the synthesis of anisotropic crystal films from a colloidal system with supramolecular complexes includes the following stages:

application of the aforementioned colloidal system onto a substrate (or onto a device or a layer in a multilayer structure); the colloidal system must possess thixotropic properties, which are provided by maintaining a preset temperature and a certain concentration of the dispersed phase;

(i) conversion of the applied colloidal system into a high flow state by any external action (heating, shear straining, etc.) decreasing viscosity of the solution; this action can be either applied during the whole subsequent alignment stage or last for a minimum necessary time, so that the system would not relax into a state with increased viscosity during the alignment stage;

(ii) external alignment action upon the system, which can be produced using mechanical factors or by any other means; the degree of the external action must be sufficient for the kinetic units of the colloidal system to acquire the necessary orientation and form a structure that would serve as a base of the crystal lattice of the anisotropic thin crystal film;

(iii) conversion of the aligned region of the layer from the state of reduced viscosity, achieved due to the external action, into the state of the initial or higher viscosity; this transition is performed so as not to cause disorientation of the electrooptical anisotropic thin crystal film structure and not to produce surface defects;

(iv) final stage of solvent removal (drying), in the course of which the final anisotropic thin crystal film structure is formed.

In the resulting anisotropic TCF, the molecular planes are parallel to each other and the molecules form a three-dimensional crystal structure, at least in a part of the layer.

Optimization of the production technology may allow the formation of a single crystal film. In order to ensure that the film will produce at least partially polarized fluorescence under UV or blue irradiation, it is necessary that the structure retain a crystalline order, at least along one of the axes. The degree of polarization of the UV- or blue-induced fluorescence is correlated with the degree of crystallinity of the film. In such crystals, the optical axis is perpendicular to the plane of molecules. Such TCFs possess a high degree of anisotropy and exhibit, at least in one direction, a high refractive index. The film thickness usually does not exceed 1 µm.

The AF TCF thickness can be controlled by the content of a solid substance in the applied solution and by the applied layer thickness. In order to obtain the films possessing desired optical characteristics, it is possible to use mixed colloidal systems (such mixtures can form joint supramolecules).

The mixing of dye solutions results in the formation of mixed aggregates of variable content. The analysis of X-ray diffraction patterns for dye mixture solutions allow us to tell about molecular packing in supramolecular with characteristic diffraction peak corresponding to interplanar spacing in the range 3.1 to 3.7 Å . In general this value is common for aromatic compounds in crystals and aggregates. Peak intensity and sharpness increase during drying, however, no changes in the peak position were found. This diffraction peak corresponds to the intermolecular spacing within aggregate stack and has been observed in X-ray diffraction patterns of different materials.

The mixing is favored by the planar structure of molecules (or their fragments) and by the coincidence of one molecular dimension in the organic compounds under consideration. In the applied aqueous layer, the organic molecules possess a long-range order in one direction, which is related to the alignment of supramolecules on the substrate surface. As the solvent is evaporated, it is energetically favorable for the molecules to form a three-dimensional crystal structure.

The backlight system according to the disclosed invention comprises a UV source (or a light source with a UV or blue component in the emission spectrum) and an anisotropic fluorescent thin crystal film (AF TCF), placed on the surface of at least one element of the backlight system between said light source and the system output. Said AF TCF is formed as described above.

The light sources for the backlight systems can represent low- or high-pressure gas-discharge lamps, including those possessing a band spectrum (Hg, H, Xe lamps, etc.); high- and ultralow-pressure arc discharge lamps; pulsed plasma discharge lamps; luminescent sources; and any other sources used in similar systems.

The aforementioned light sources usually exhibit at least one intense emission peak in the wavelength range between 260 and 450 nm. The AF TCF is selected so as to provide that the film material possesses a luminescence excitation spectrum with a band corresponding to the above peak in the source emission spectrum.

Said AF TCF can be colorless (transparent) or colored (absorbing) in the visible spectral range. In the latter case, the film may, depending on the particular optical properties, perform the function of retarding or polarizing the visible light simultaneously with the main function of emitting polarized light.

In addition, the film material can be selected so that AF TCF will emit polarized light within a sufficiently narrow spectral interval. Such films can be used for creating sources of polarized color light, in particular, for color matrices to be used in the backlight systems of color LCDs. Using luminescent light sources provides for obtaining of more clear colors of the image and for increasing the light yield at the expense of reduced absorption losses in the internal elements of the system.

In some cases, polarization of the visible light can be provided by an additional polarizer placed above the AF TCF or on top of the backlight system. In such cases, the axes of the aforementioned rodlike supramolecules are aligned along the absorption axes of the polarizer.

The backlight system may also contain additional optical elements such as light collimators, specular or diffuse reflectors, reflectors in the form of a network of grooves that are substantially V-shaped, etc. These elements can perform the functions of collecting and guiding the light emitted by the source, In order to provide for a more effective polarization of light emitted by the source, the reflecting elements could be oriented at the Brewster relative to the direction of light propagation. In this case, the light is additionally polarized upon reflection. The reflecting elements usually have the shape of separate steps, prisms, etc. Within the framework of this invention, such elements can be also covered with AF TCFs. Such a film has to be oriented so that the plane of polarization of the luminescent light would coincide with the plane of polarization of the reflected visible light of the source spectrum. The most effective scheme that allows virtually all nonpolarized visible light to be converted into polarized with minimum losses is an optical recycling scheme with reflective polarizer.

The optical recycling scheme usually contains a reflective polarizer, a reflector, and in some cases a quarter-wave plate placed between the reflective polarizer and the reflector. The optical recycling scheme according to the present invention contains an additional AF TCF between the light source and the reflective polarizer, which converts at least a part of the UV radiation emitted by the source into a partially polarized visible light.

The reflective polarizer is capable of transmitting visible light of one polarization while reflecting all light of the perpendicular polarization. Passing through the quarter-wave plate, the reflected polarized light changes the polarization direction, reflects from a mirror, then again passes through a quarter-wave plate, and enters the reflective polarizer again, this time in the first polarization state. The AF TCF and the reflective polarizer are arranged so as to provide that the transmission axis of the reflective polarizer would coincide with plane of polarization of the luminescent light emitted by the AF TCF (i.e., this axis is perpendicular to the axes of the aforementioned rodlike supramolecules).

All the aforementioned backlight systems can be used in the effective backlight systems for LCDs.

FIGS. 1-6 show schematic cross sections of some backlight systems according to the disclosed invention. In the backlight system, presented in FIG. 1, the light source 1 is an assembly of light sources representing, for example, luminescent lamps or a LED matrix. AF TCF 2 is applied directly onto said assembly of light sources. Reflector 3 placed behind the backlight system provides for a more effective use of the source emission. The reflector can be of any type—specular or diffusive.

Figure 2:
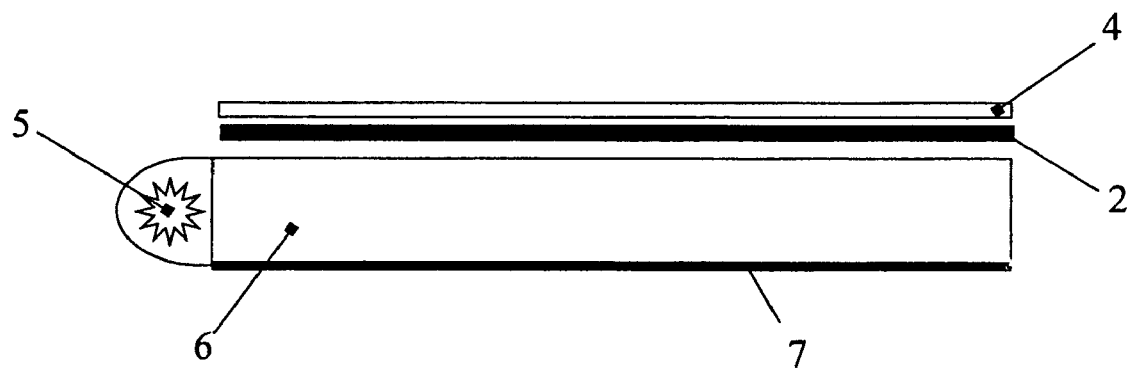
FIG. 2 is a schematic cross section of a backlight system with a light source positioned on one side.

FIG. 2 shows another embodiment of the disclosed invention, representing a backlight system with the light source 5 placed at one side. Such schemes are usually employed in order to reduce the overall thickness of the device (e.g., LCD) with the backlight system. The light emitted by the source is fed to light guide 6 and, upon reflection from diffuse reflector 7, strikes AF TCF 2. An additional dichroic polarizer 4 of the visible light can be placed on the top of the backlight system. This system emits polarized light in the visible spectral range and can be used as a backlight system for transmission LCDs with a single front polarizer.

As another embodiment of the present invention the backlight system can include a retarder or a color filter or some other additional optical element positioned on the top of the backlight system.

Figure 3:
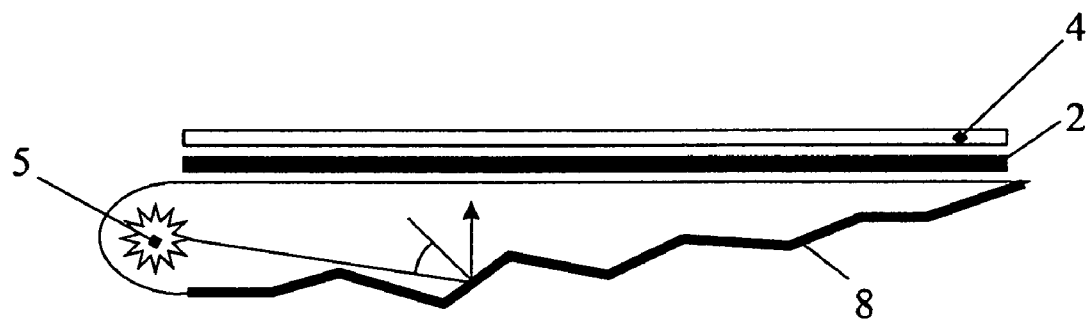
FIG. 3 is a schematic cross section of a backlight system with a reflecting elements positioned at the Brewster angle to the direction of light emitted by the light source.

FIG. 3 illustrates the design with use of a reflective element which surface is oriented at the Brewster angle relative to the direction of light emitted by the source. In order to provide this, reflector 8 can have the shape of separate steps, each step having a definite slope.

In another embodiment every separate step of a reflector is formed by separate elements. In this case the surface of the reflective elements is covered with a network of grooves which are substantially V-shaped.

Using the Cascade Crystallization technology of manufacturing AF TCFs, it is possible to apply film 2 directly on the reflector steps (FIG. 6) at a required angle. Film 2 is oriented so that the plane of polarization of the luminescent light would coincide with the plane of polarization of the reflected light in the visible part of the spectrum of source 5.

Figure 4:
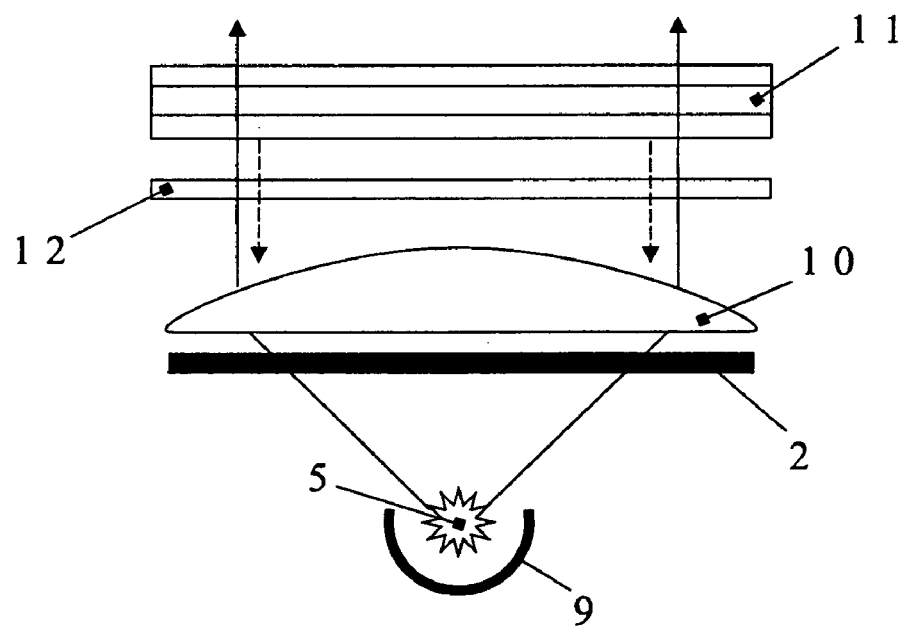
FIG. 4 is a schematic cross section of a high-intensity backlight system comprising a light recycling scheme.

FIG. 4 shows the scheme of a high-intensity (high-brightness) backlight system that can be used, for example, in LCDs of the projection type. This system comprises a light source 5, a reflector 9, an AF TCF 2, a converging lens 10, a reflective polarizer 11 and a quarter-wave plate 12. The reflective polarizer is a multilayer stack of pairs of adjacent material layers. Each of these pairs exhibits a refractive index difference between the adjacent layers in one direction in the plane of the reflective polarizer and exhibits essentially no refractive index difference between adjacent layers in another direction in the plane of the reflective polarizer, which is perpendicular to the first direction. The quarter-wave plate 12 is secured to the reflective polarizer 11. The AF TCF converts the UV part of the source emission spectrum into visible light which is at least partially polarized. Light rays from source 5 either pass through the reflective polarizer and onto the LCD (not depicted), or are reflected back toward the light source, depending on their polarization. Light, which is reflected by the reflective polarizer, is reflected by the reflector back toward the LCD again. The use of the quarter-wave plate and the reflector help to recycle what would typically be regarded as wasted light, while at the same time reducing heat build-up within the LCD.

Figure 5:
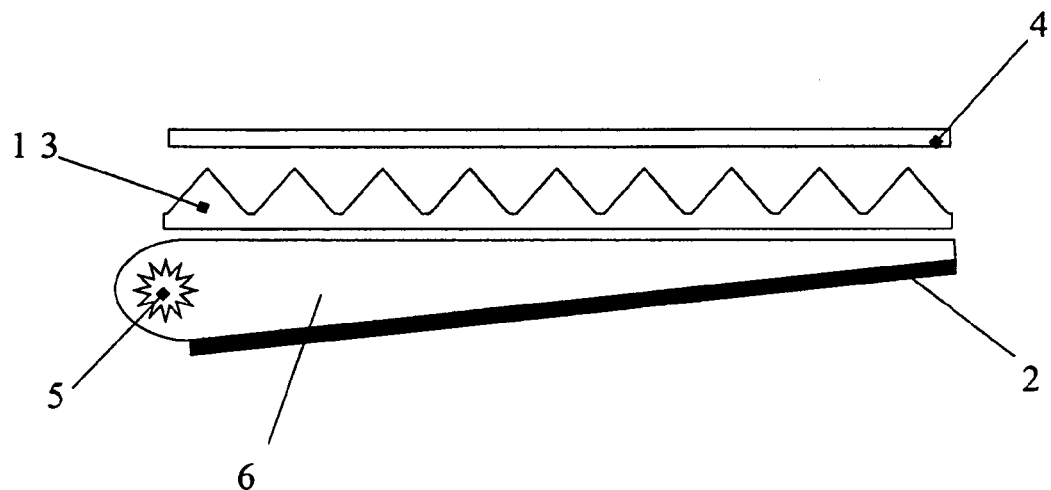
FIG. 5 is a schematic cross section of a backlight system comprising an assembly of prisms as a light collimator.
Figure 6:
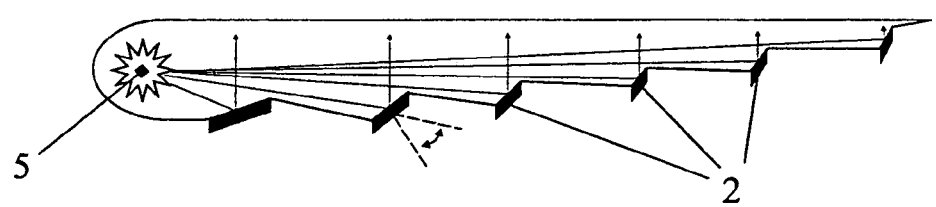
FIG. 6 is a schematic cross section of a backlight system with the AF TCF directly applied on the reflector steps.

In one embodiment a backlight system comprises an additional optical element that serves as a light collimator. FIG. 5 shows a backlight system comprising a light source 5, a light guide 6, the AF TCF 2 (which is a source of luminescent polarized light and is arranged so that it is simultaneously a diffuse reflector of the visible light emitted by the source), and an additional optical element representing an assembly of prisms 13. This element performs the function of light collimator by transmitting the rays normal to the plane of the backlight system and simultaneously increasing the degree of polarization of the transmitted light. This backlight system is also provided with an additional dichroic polarizer 4 placed at the system output.

Figure 7:
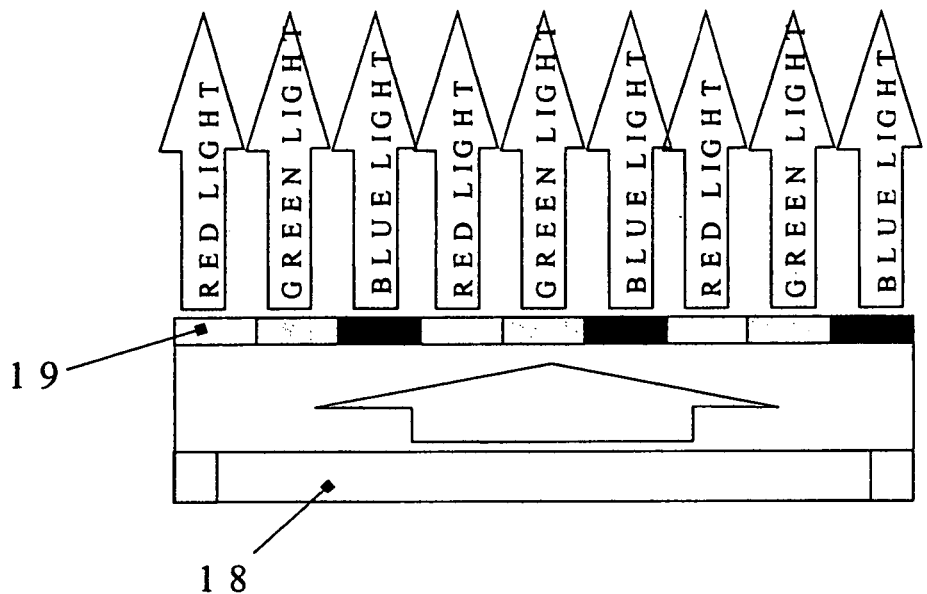
FIG. 7 illustrates a work of a color backlight system according to the invention.

The backlight system may also serve a source of spectrally pure polarized light as in FIG. 7, in particular for use in color LCDs. This backlight system includes a light source 18 having a dominant emission peak in the range of 360 to 420 nm and the AF TCF 19 representing a matrix of individual elements emitting polarized light in various spectral intervals. The adjacent matrix elements form RGB (Red-Green-Blue) triads.

Figure 8:
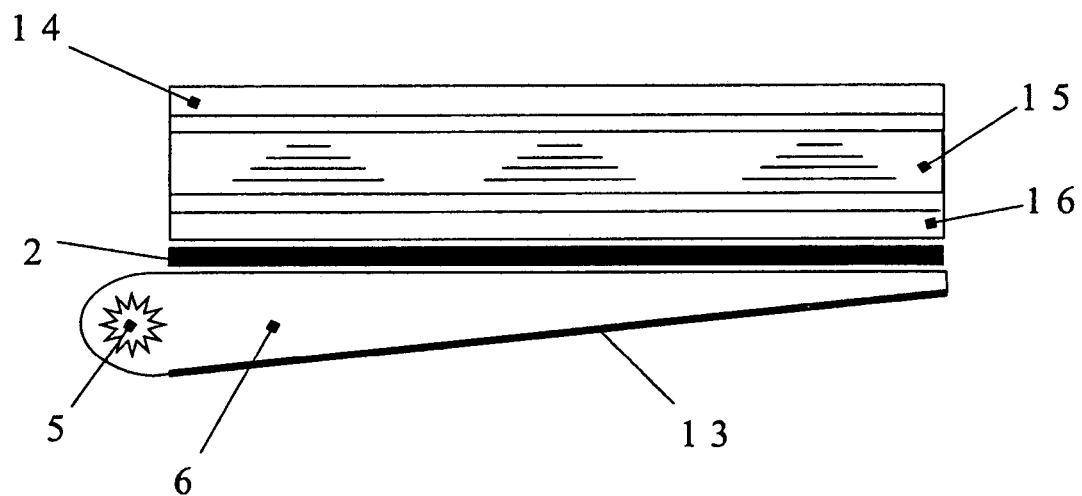
FIG. 8 shows a schematic cross section of a liquid crystal display according to the present invention.

The above-described backlight systems can be used in liquid crystal displays. The LCD in FIG. 8 comprises the front 14 and rear 16 panels with the corresponding functional layers and dichroic polarizers, a liquid crystal material layer 15, and a backlight system. The latter comprises a light source 5, a light guide 6, a diffuse reflector 13, and an AF TCF 2, which is the source of luminescent polarized light. This LCD design provides for increased brightness and, in some cases, improved color rendering as described above.

EXAMPLES

FIGS. 9 to 12 present data on the optical performance of AF TCFs manufactured from different materials. Is and Ip are intensities of light fluorescence for two different directions of polarization responsive to light from a light source having an emission spectrum in a wavelength range between 250 and 450 nanometers.

Figure 9:
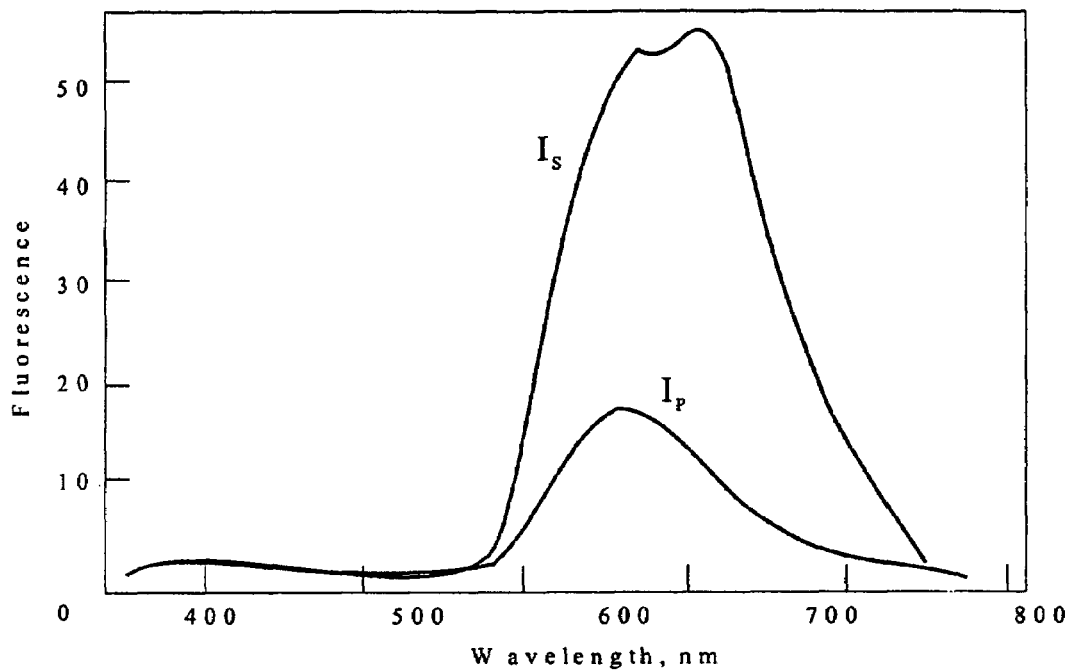
FIGS. 9-12 present data on the optical performance of the AF TCFs made of different organic compounds.

FIG. 9 presents data on fluorescence performance of AF TCF made from the product of sulfonation of Bisbenzimidazo[2,1-b:1',2'-j]benzo[lmn][3,8]phenanthroline-6,9-dione.

Figure 10:
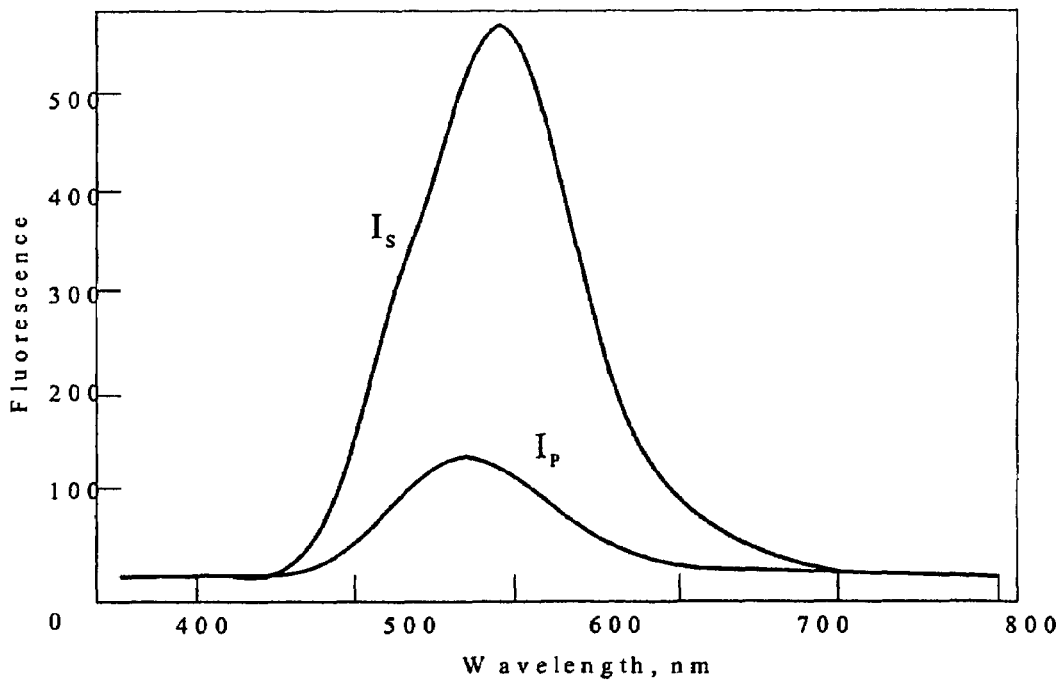

FIG. 10 presents data on fluorescence performance of AF TCF made from the product of sulfonation of 7H-Benzimidazo[2,1-a]benz[de]isoquinolin-7-one.

Figure 11:
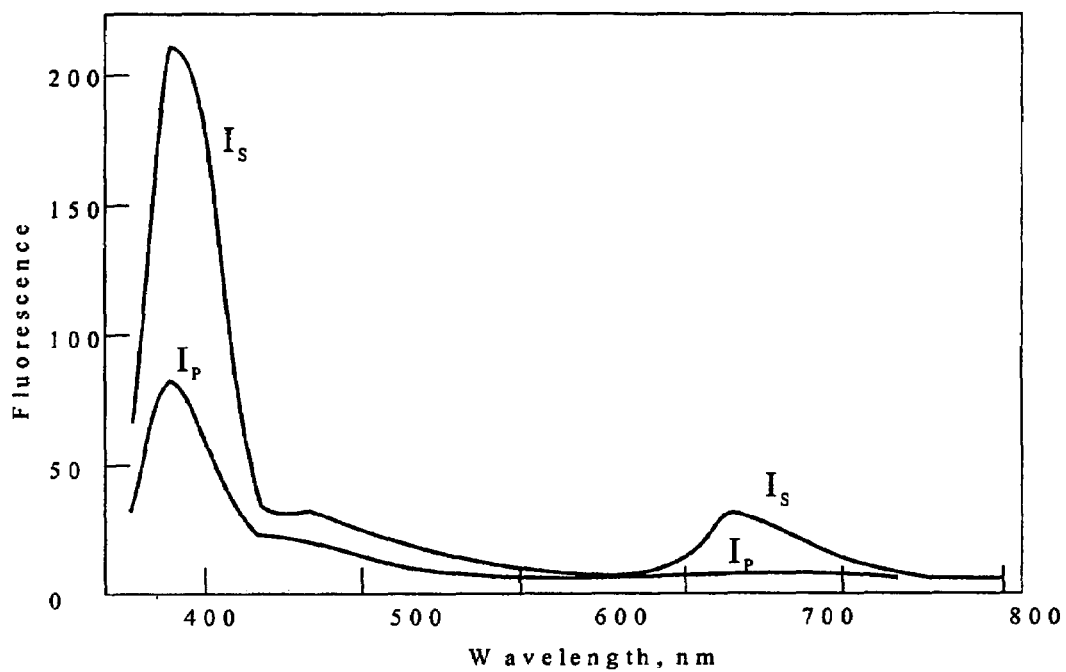

FIG. 11 presents data on fluorescence performance of AF TCF made from the product of sulfonation of Indanthrone(6,15-Dihydro-5,9,14,18-anthrazinetetrone).

Figure 12:
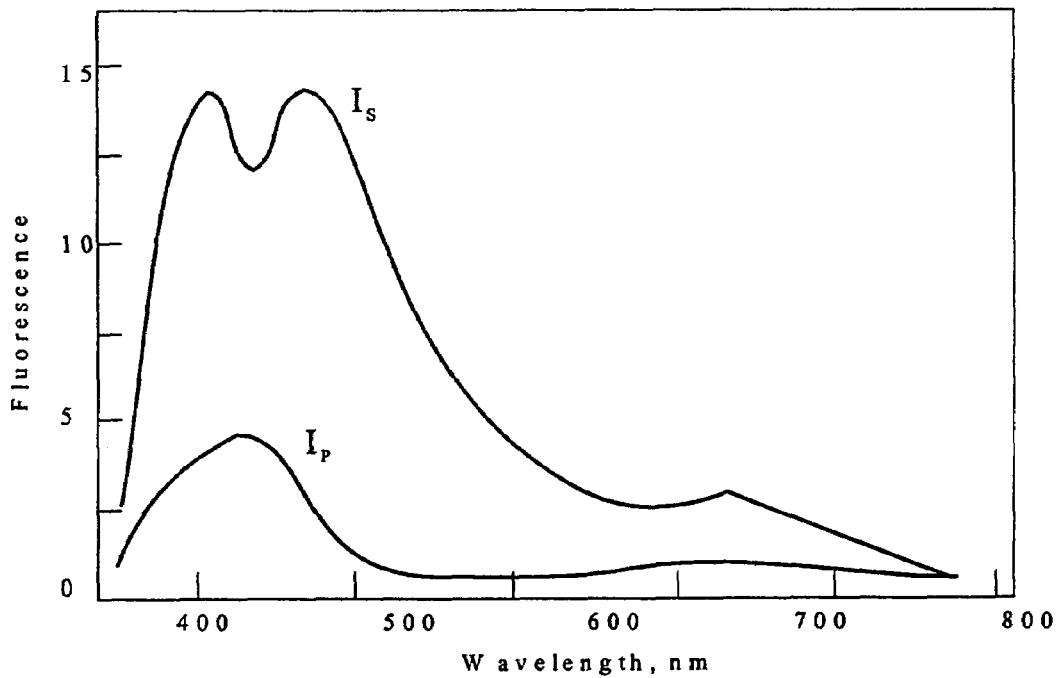

FIG. 12 presents data on fluorescence performance of AF TCF made from the product of sulfonation of Bisbenzimidazo[2,1-a:1',2'-b']anthra[2,1,9-def:6,5,10-d'e'f]diisoquinoline-6,11-dione (mixture with trans-isomer).

The foregoing description of specific embodiments and examples of the invention have been presented for the purpose of illustration and description, and although the invention has been illustrated by certain of the preceding examples, it is not to be construed as being limited thereby. They are not intended to be exhaustive or to limit the invention to the precise forms disclosed, and obviously many modifications, embodiments, and variations are possible in light of the above teaching. It is intended that the scope of the invention encompass the generic area as herein disclosed, and by the claims appended hereto and their equivalents.

What is claimed is:
1. A backlight system comprising:
  at least one light source emitting light with an emission spectrum with at least one peak in a wavelength range between 250 and 450 nm, and
  an anisotropic fluorescent thin crystal film (AF TCF) placed on a light path of the light emitted by the light source,
  wherein said AF TCF is formed by rodlike supramolecules composed of disc-shaped molecules of at least one polycyclic organic compound which is a product of sulfonation of at least one of the group consisting of

Bisbenzimidazo[2,1-b:1',2'-j]benzo[lmn][3,8]phenan-throline-6,9-dione, and

7H-Benzimidazo[2,1-a]benz[de]isoquinolin-7-one, wherein said rodlike supramolecules has a preferable alignment direction, and emitting polarized visible light when irradiated by light within said wavelength range.

2. The backlight system according to claim 1, wherein the emission spectrum has at least one peak in the wavelength range between 260 and 380 nm.

3. The backlight system according to claim 2, wherein said light source is selected from the group comprising plasma sources of optical radiation, luminescent sources of optical radiation, and lasers.

4. The backlight system according to claim 1, further including a light collimator placed to collimate the light output from the system.

5. The backlight system according to claim 4, further including a polarizer of visible light placed after AF TCF in the light path of the light emitted by the light source.

6. The backlight system according to claim 5, wherein said preferable alignment direction is parallel to the absorption axis of the polarizer of visible light.

7. The backlight system according to claim 1, further including a reflector for reflecting the light emitted by the light source and the light fluoresced by AF TCF.

8. The backlight system according to claim 7, wherein said reflector is specular.

9. The backlight system according to claim 7, wherein said reflector is diffuse.

10. The backlight system according to claim 7, wherein said reflector is oriented at the Brewster angle.

11. The backlight system according to claim 7, wherein the reflector has a surface covered with a network of grooves, which are substantially V-shaped.

12. The backlight system according to claim 10, wherein the AF TCF is placed on top of the reflector.

13. The backlight system according to claim 7, further including a reflective polarizer placed to receive the emitted polarized light.

14. The backlight system according to claim 13, further including a quarter-wave plate placed between the reflective polarizer and the reflector.

15. The backlight system according to claim 13, wherein the transmission axis of the reflective polarizer is perpendicular to said alignment direction.

16. The backlight system according to claim 1, wherein the AF TCF has an interplanar spacing of 3.4±03 Å along said preferred direction.

17. The backlight system according to claim 1, wherein at least one said polycyclic organic compound with disc-shaped molecules contains heterocycles.

18. The backlight system according to claim 5, wherein the AF TCF is formed from a lyotropic liquid crystal.

19. The backlight system according to claim 1, further comprising a retarder.

20. The backlight system according to claim 1, further comprising a color filter.

21. An anisotropic fluorescent thin crystal film (AF TCF) for use in a backlight system, comprising at least one layer formed by rodlike supramolecules comprising disc-shaped molecules of at least one polycyclic organic compound which is a product of sulfonation of at least one of the group consisting of Bisbenzimidazo[2,1-b:1',2'-j]benzo[lmn][3,8]phenan-throline-6,9-dione, and 7H-Benzimidazo[2,1-a]benz[de]isoquinolin-7-one, wherein the rodlike supramolecules have a preferable alignment direction and emit polarized visible light when irradiated in the wavelength range between 250 and 450 nm.

22. The AF TCF according to claim 21, wherein at least one said polycyclic organic compound with disc-shaped molecules contains heterocycles.

23. The AF TCF according to claim 21, wherein an interplanar spacing along said direction is 3.4±03 Å.

24. The AF TCF according to claim 21, wherein said layer serves as a polarizer of visible light and/or a retarder.

25. The AF TCF according to claim 21, wherein the film further comprising a polarizer.

26. The AF TCF according to claim 21, wherein the film further comprising a retarder.

27. The AF TCF according to claim 21, wherein the film further comprising a color filter.

28. A liquid crystal display, comprising
a liquid crystal cell, and
a backlight system comprising
a light source emitting light with an emission spectrum with at least one peak in a wavelength range between 250 and 450 nm, and
an anisotropic fluorescent thin crystal film (AF TCF) placed on a light path of the light emitted by the light source,
wherein said AF TCF is formed by rodlike supramolecules composed of the disc-shaped molecules of at least one polycyclic organic compound which is a product of sulfonation of at least one of the group consisting of
Bisbenzimidazo[2,1-b:1',2'-j]benzo[lmn][3,8]phenan-throline-6,9-dione, and
7H-Benzimidazo[2,1-a]benz[de]isoquinolin-7-one,
wherein the rodlike supramolecules have preferable alignment direction and emitting polarized visible light when irradiated by light from said wavelength range.

29. A liquid crystal display comprising
a liquid crystal cell, and
a backlight system as in claim 4.

30. The backlight system according to claim 11, wherein the AF TCF is placed on top of the reflector.

31. A liquid crystal display comprising a liquid crystal cell, and
a backlight system as any one of claims 7-17 and 30.

* * * * *